(12) United States Patent
Slaughter

(10) Patent No.: US 10,077,573 B1
(45) Date of Patent: Sep. 18, 2018

(54) PORTABLE HUNTING BLIND

(71) Applicant: Jerry Micah Slaughter, Huntsville, TX (US)

(72) Inventor: Jerry Micah Slaughter, Huntsville, TX (US)

(*) Notice: Subject to any disclaimer, the term of this patent is extended or adjusted under 35 U.S.C. 154(b) by 0 days.

(21) Appl. No.: 14/992,253

(22) Filed: Jan. 11, 2016

Related U.S. Application Data

(60) Provisional application No. 62/101,594, filed on Jan. 9, 2015, provisional application No. 62/216,712, filed on Sep. 10, 2015.

(51) Int. Cl.
| | | |
|---|---|---|
| *E04H 15/44* | (2006.01) | |
| *A01M 31/00* | (2006.01) | |
| *E04H 15/00* | (2006.01) | |
| *A01M 31/02* | (2006.01) | |
| *E04H 15/54* | (2006.01) | |
| *E04H 15/58* | (2006.01) | |
| *E04H 15/64* | (2006.01) | |
| *E04H 15/48* | (2006.01) | |
| *E04B 7/00* | (2006.01) | |

(52) U.S. Cl.
CPC ......... *E04H 15/001* (2013.01); *A01M 31/025* (2013.01); *E04B 7/00* (2013.01); *E04H 15/44* (2013.01); *E04H 15/48* (2013.01); *E04H 15/54* (2013.01); *E04H 15/58* (2013.01); *E04H 15/64* (2013.01)

(58) Field of Classification Search
CPC ....... E04H 15/48; E04H 15/44; E04H 15/001; E04H 15/54; E04H 15/18; E04H 15/64; E04H 15/34; E04H 15/52; E04B 7/00; E04B 7/107; E04B 1/344; E04B 1/3445; A01M 31/025
USPC .......... 135/97, 135, 143–144, 147, 157–159, 135/119, 901; 52/63, 70–72, 82
See application file for complete search history.

(56) References Cited

U.S. PATENT DOCUMENTS

| | | | |
|---|---|---|---|
| 459,764 A | 9/1891 | Orr | |
| 1,610,801 A * | 12/1926 | McKinnon | E04H 15/32 135/100 |
| 2,836,860 A * | 6/1958 | Staropoli | E04B 1/34326 108/158.11 |
| 2,890,498 A * | 6/1959 | Bigelow | E04H 15/008 135/143 |
| 2,928,404 A * | 3/1960 | Klages | E04H 15/322 135/115 |
| 2,967,534 A | 1/1961 | Silye | |
| 3,018,857 A | 1/1962 | Parham | |
| 3,118,186 A | 1/1964 | Moss | |
| 3,134,200 A | 5/1964 | Moss | |
| 3,169,543 A | 2/1965 | McGerty | |
| 3,333,373 A | 8/1967 | Taylor et al. | |
| 3,534,412 A * | 10/1970 | Crook | E04H 4/108 4/498 |
| 3,550,601 A | 12/1970 | Peters | |
| 3,709,237 A | 1/1973 | Smith | |
| 3,827,019 A | 7/1974 | Serbu | |
| 3,913,598 A | 10/1975 | Glutting, Jr. | |
| 3,996,706 A | 12/1976 | Bomgaars | |

(Continued)

*Primary Examiner* — Winnie S Yip
(74) *Attorney, Agent, or Firm* — John R Casperson

(57) ABSTRACT

A hunting blind is formed from rectangular panels hinged for accordion folding. A roof structure is provided that stabilizes the blind with end pins interlocking with the panels. A window covering structure is provided that is silently openable.

7 Claims, 4 Drawing Sheets

(56) References Cited

U.S. PATENT DOCUMENTS

| | | | | |
|---|---|---|---|---|
| 4,067,346 | A | 1/1978 | Husted | |
| 4,129,139 | A | 12/1978 | Powers | |
| 4,640,061 | A | 2/1987 | Trumley | |
| 4,726,153 | A * | 2/1988 | Adler | E04H 15/34 135/88.13 |
| 4,777,755 | A | 10/1988 | Colburn | |
| 4,910,928 | A * | 3/1990 | Cellar, Jr. | E04H 1/1222 52/282.1 |
| 5,226,440 | A * | 7/1993 | Fuhrman | E04H 15/18 135/159 |
| 5,301,706 | A | 4/1994 | Jones | |
| 5,307,829 | A * | 5/1994 | Dalo | E04H 15/322 135/125 |
| 5,352,149 | A | 10/1994 | Melshenko et al. | |
| 5,373,863 | A | 12/1994 | Prizio | |
| 5,592,960 | A | 1/1997 | Williams | |
| 5,802,778 | A | 9/1998 | Thorp et al. | |
| 6,089,247 | A * | 7/2000 | Price | E04H 15/48 135/145 |
| 6,532,701 | B2 | 3/2003 | Williams | |
| 6,553,725 | B2 | 4/2003 | Washington | |
| 6,745,521 | B1 * | 6/2004 | Klemming | E04H 15/44 52/79.6 |
| 6,761,181 | B1 * | 7/2004 | Tseng | E04H 15/44 135/133 |
| 6,941,961 | B1 | 9/2005 | Eastman, II | |
| 6,942,065 | B1 | 9/2005 | Price | |
| 6,981,540 | B2 | 1/2006 | Deblois | |
| 7,117,644 | B2 | 10/2006 | Dehart | |
| 7,168,522 | B1 | 1/2007 | Price | |
| 7,743,781 | B2 | 6/2010 | Slaughter | |
| 8,256,443 | B2 | 9/2012 | Neal | |
| 8,429,858 | B1 | 4/2013 | Robinson et al. | |
| D715,006 | S * | 10/2014 | Pomerantz | D30/112 |
| 9,556,639 | B2 * | 1/2017 | Hunt | E04H 15/16 |
| 2002/0026742 | A1 | 3/2002 | Washington | |
| 2005/0108955 | A1 | 5/2005 | Howe et al. | |
| 2006/0249640 | A1 | 11/2006 | Hanson | |
| 2007/0235068 | A1 * | 10/2007 | Green | E01F 13/022 135/114 |
| 2008/0210283 | A1 | 9/2008 | Hinz | |
| 2013/0276382 | A1 * | 10/2013 | Workman | E04H 15/44 52/63 |
| 2014/0034101 | A1 * | 2/2014 | Rowley | E04H 15/001 135/143 |
| 2015/0053246 | A1 | 2/2015 | Lange | |

* cited by examiner

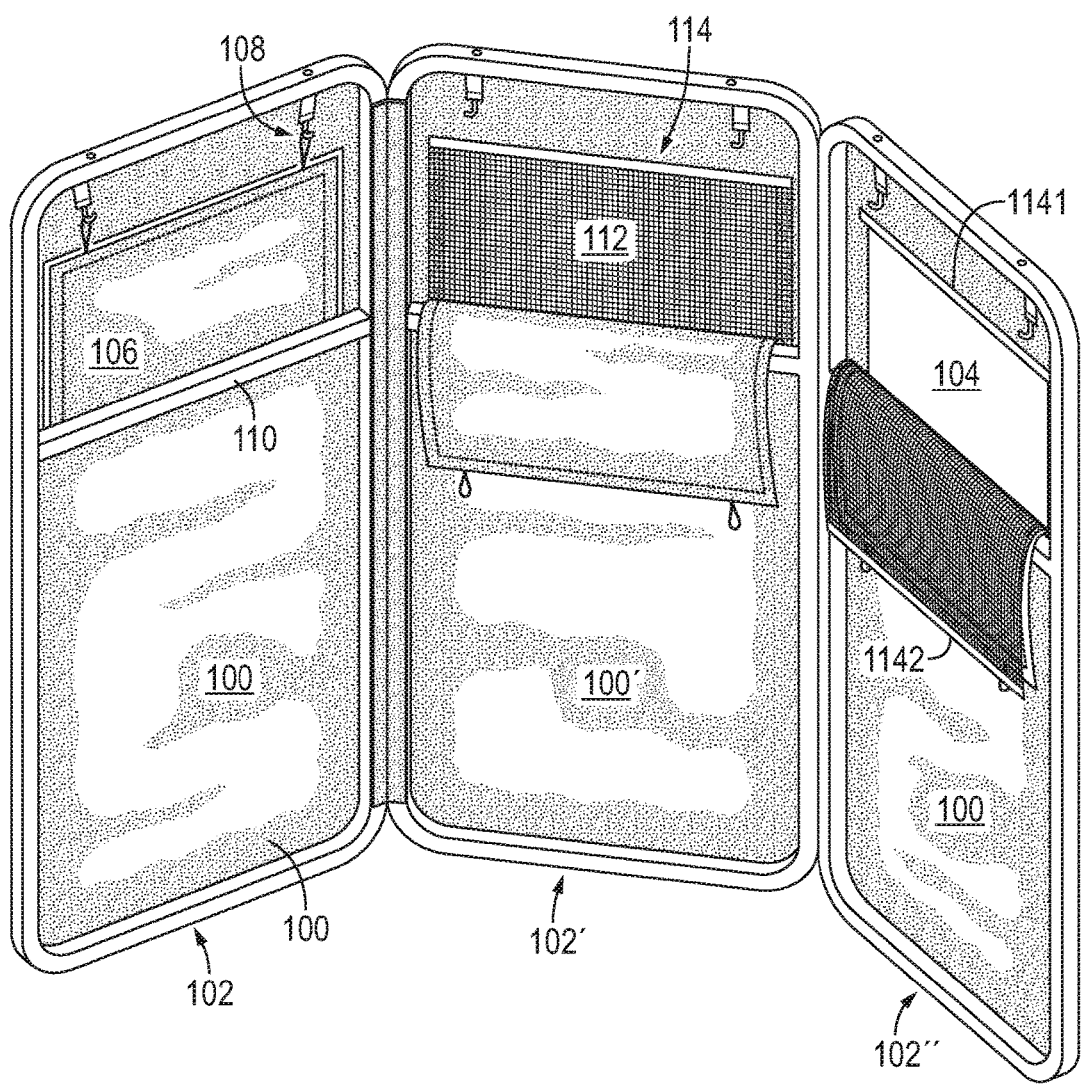

PORTABLE HUNTING BLIND

FIELD OF THE INVENTION

The invention relates to structural, roof and windows improvements for a portable hunting blind.

BACKGROUND OF THE INVENTION

Prior art portable blinds often have no roof, or an inadequate roof. For deer hunting, a roof is desirable, as it darkens the inside of the blind, making detection of the blind occupants less likely. A waterproof roof is even more desirable, as it shelters the occupants from the sun and rain, making it easier for them to remain still.

Another factor for the desirability of a blind is structural stability. A blind that is structurally stable can provide a rifleman or a cameraman with a solid rest, enabling more accurate shots or photos.

Also, prior art blinds are often complicated to assemble, and can have many parts.

My earlier patent, U.S. Pat. No. 7,743,781 issued Jun. 29, 2010, the disclosure of which is incorporated by reference herein, solves many of the forgoing deficiencies with a six-paneled accordion-fold blind.

My pending nonprovisional application for patent Ser. No. 14/474,415 filed Sep. 2, 2014, the disclosure of which is incorporated by reference herein, solves many of the foregoing deficiencies with an eight-paneled accordion-fold blind.

It is an object of this invention to provide a blind in which the roof structure provides stability as this minimizes the number of parts required to provide both a roof and stability for the blind.

It is a further object of this invention to provide a roof structure for a blind of the general type shown in my earlier patent or pending nonprovisional patent application.

It is another object of this invention to provide windows for a portable hunting blind that are well suited for hunting and observation.

PRIOR ART

U.S. Pat. No. 3,550,601 discloses a roof frame comprising bows formed from resilient material, such as music wire. The bows connect to the upper corners or ends of the frames to permit pivotal movement and to a juncture structure at the center of frame. The curvature of the bows exerts outward yielding pressure against the corners of the frames.

U.S. Pat. No. 3,996,706 discloses a plurality of panels interconnected along their upper ends by a cable link. The roof assembly includes a plurality of tube members and a central hub or spider. The tube members are compressed to bow downwardly and are affixed to the cable link to permit pivotal movement between adjacent pairs of panels.

U.S. Pat. No. 4,640,061 discloses a plurality of panels interconnected along their upper ends by a cable link. The roof assembly comprises a plurality of flexible tube members connected to a central hub. The outer end of each of the tube members includes a hook shaped fitting that engages the cable link. The bowed tubes push the panels outwardly.

U.S. Pat. No. 4,067,346 discloses a plurality of panels. The roof structure employs spreader bars or struts connected to the upper ends of corner posts by pins which protrude from the upper end of the posts. The pins are received by notches or holes in the ends of the spreader bars. The spreader bars are bowed to hold the corner posts apart.

SUMMARY OF THE INVENTION

One embodiment of the invention comprises a tubular element and a frame useful in fabricating a hunting blind. The tubular element is elongated and has a first end and a second end. The first end is bent at an obtuse angle to form a short projecting pin. The frame is tubular and is for supporting a covering to form a panel. The frame has a pair of vertical legs and a connecting horizontal leg and further has at least a partial top plate extending transversely from an upper end of at least one of the pair of vertical legs. The at least partial top plate defines a borehole parallel to one of the vertical legs that receives the short projecting pin on the end of the elongated tubular member. The frame can be connected to other frames along its edges and via the elongated tubular member to construct the blind.

In another embodiment of the invention, there is provided an element that is useful for a roof brace in a hunting blind. The element comprises a spanner head and an elongated tubular element. The spanner head has two short parallel pins extending transversely from a connecting tubing that connects the pins. The elongated tubular element extends transversely from the connecting tubing from a location between the pins. The elongated tubular element has a first end and a second end is attached to the connecting tubing by its first end. The roof brace element sets the angle between panels for the blind that are hinged together as well as provides support for the roof.

In another embodiment of the invention, there is provided a pair of connected panel frames that are useful in the construction of a hunting blind. The apparatus comprises first and second tubular frames, a hinge, and a roof frame element. The first tubular frame is for supporting a covering to form a panel. The first tubular frame has a pair of vertical legs and a connecting horizontal leg. The frame further has an at least partial top plate extending transversely from an upper end of at least one of the pair of vertical legs. The at least partial top plate defines a borehole parallel to one of the vertical legs. The second tubular frame is supporting a covering to form a panel. The second tubular frame has a pair of vertical legs and a connecting horizontal leg. The second tubular frame is positioned alongside the first tubular frame. The second tubular frame further has at least a partial top plate extending transversely from an upper end of at least one of the pair of vertical legs. The at least partial top plate defines a borehole parallel to one of the vertical legs. The hinge connects a vertical leg of the second frame with a vertical leg of the first frame. The roof frame element has two short parallel pins extending transversely from a connecting tubing that connects the pins and an elongated tubular element extending transversely from the connecting tubing from a location between the pins to partially support a roof cover. The two short parallel pins are positioned one in each of the boreholes to position the plane of the first frame at a predetermined angle with the plane of the second frame and form a first connected pair of frames. Additional frames or pairs of frames and roof frame elements can be used to complete the blind. The roof frame element sets the angle between the panels and the distance across the completed blind.

Another embodiment of the invention provides a covering for a panel frame. The covering is generally rectangular and has a front side and a back side, a height, a width, with the height being greater than the width, and an upper portion and a lower portion. A generally rectangular window opening is formed in the upper portion of the panel covering. The window has a length and a width, with the width being greater than the length and being measured parallel to the width of the generally rectangular piece of panel covering. A window cover is provided. The window cover is formed from an opaque, flexible sheet, or alternatively, can be a veil or flexible screen. The window cover has a front side and a back side and covers the generally rectangular window from the inside. The window cover has a length and a width slightly greater than the window and is attached to the inside of the panel covering by its lower edge along the lower edge of the window. The window cover is held in covering relationship with the window opening by a releasable fastener system connecting the upper edge of the window covering with the back side of the panel covering. The covering can be dropped out of covering relationship with the window with a minimum of motion visible from the outside of the blind.

BRIEF DESCRIPTION OF THE DRAWINGS

FIG. 4 is a pictorial illustration an inside view of three panels of a blind as in FIG. 3.

DETAILED DESCRIPTION OF THE INVENTION

Figure 1:
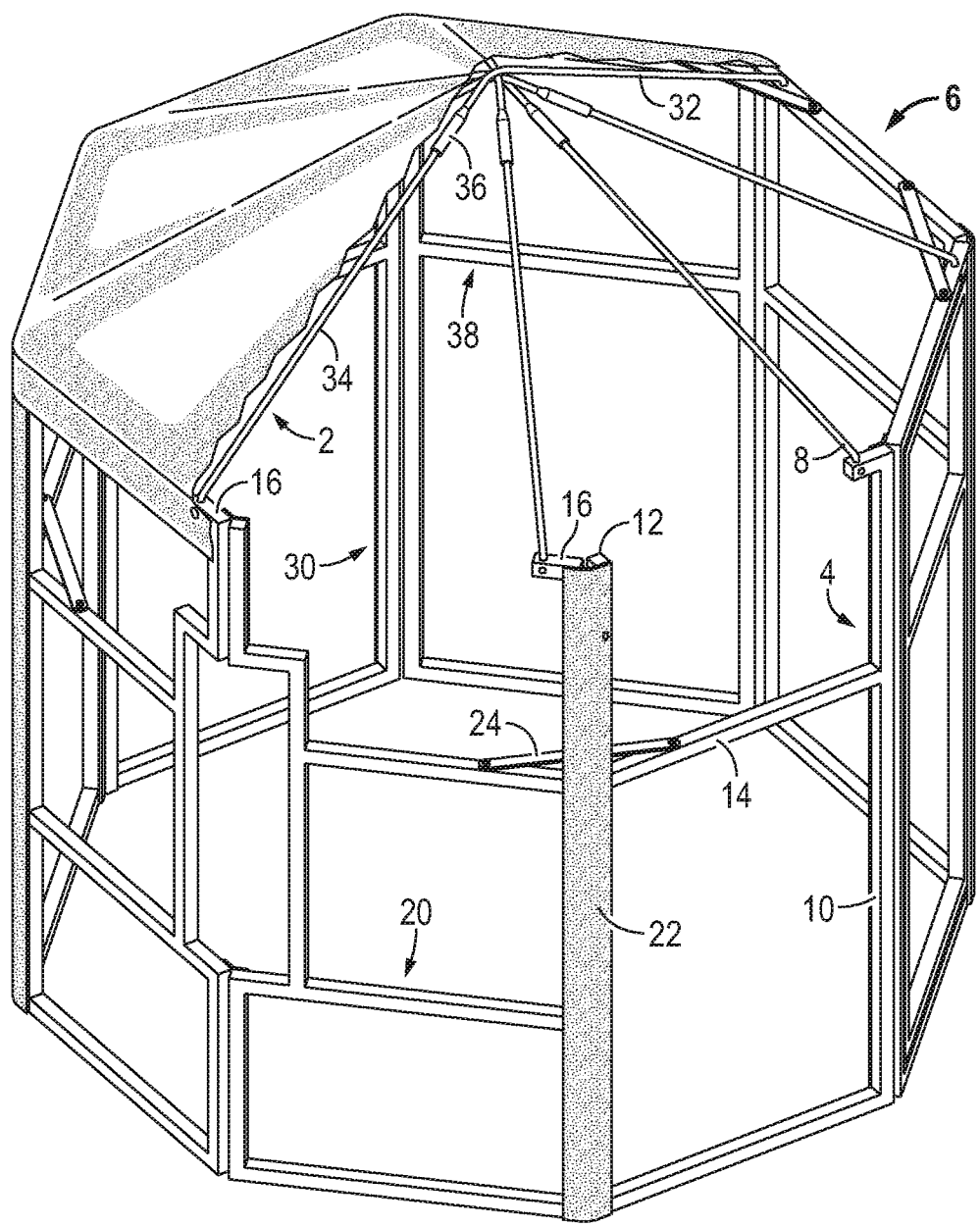
FIG. 1 is a pictorial illustration of an eight-panel blind in accordance with an embodiment of the invention with portions of the covering removed to show details of the frame.

One embodiment of the invention comprises a tubular element 2 and a frame useful 4 in fabricating a hunting blind 6. The tubular element is elongated and has a first end 8 and a second end. The first end is bent at an obtuse angle to form a short projecting pin. The frame is tubular and is for supporting a covering to form a panel. The frame has a pair of vertical legs 10, 12 and a connecting horizontal leg 14 and further has at least a partial top plate 16 extending transversely from an upper end of at least one of the pair of vertical legs. The at least partial top plate defines a borehole parallel to one of the vertical legs which receives the short projecting pin on the end of the elongated tubular member. The at least partial top plate extends toward the other vertical leg. The frame can be connected to other frames along its edges and via the elongated tubular member to construct the blind.

For example, there can be provided a second tubular frame 20 for supporting a covering to form a panel. The second frame has a pair of vertical legs and a connecting horizontal leg and is positioned alongside the first tubular frame. A hinge 22 connects a vertical leg of the second frame with a vertical leg of the first frame, and a latch 24 connects the first frame with the second frame to position the plane of the first frame at a predetermined angle with the plane of the second frame and form a first connected pair of frames.

The predetermined angle is determined by the number of sides for the blind, and is generally selected from about 90 degrees, about 120 degrees, about 135 degrees, and about 144 degrees. Generally speaking, the tubulars in the first and second frames form an H-shape. It is intended herein that the term tubular encompasses equivalents such as rod stock or bar stock unless otherwise stated.

Usually, the blind will be composed of an even number of panels. A third tubular frame 30 similar to the first can be provided for supporting a covering to form a panel. The third frame has a pair of vertical legs and a connecting horizontal leg and further has at least a partial top plate. The second end of the elongated tubular element 2 is bent at an obtuse angle to form a short projecting pin. The at least partial top plate of the third tubular frame defines a borehole parallel to one of the vertical legs of third tubular frame that receives the short projecting pin on the second end of the elongated tubular member. The panel supported by the third frame is typically positioned across the finished blind from the first and second panels.

For convenience, the elongated tubular element 2 comprises first and second tubular sections 32, 34 each having a bent first end and connected by their second ends to a socket connector 36.

In the illustrated embodiment, the blind comprises a fourth tubular frame 38 for supporting a covering to form a panel. The fourth frame has a pair of vertical legs and a connecting horizontal leg and is positioned alongside the third frame. A second hinge connecting a vertical leg of the third frame with a vertical leg of the fourth frame, and a latch connects the horizontal leg of the third frame with the horizontal leg of the fourth frame to position the plane of the third frame at the selected predetermined angle with the plane of the fourth frame and form a second connected pair of frames that is connected to the first connected pair of frames by the first and second elongated tubular sections and connecting socket.

For a six sided blind, the apparatus further comprises a fifth frame positioned between the first frame and the third frame and a sixth frame positioned between the second frame and the fourth frame, each frame for supporting a covering to form a panel and having a pair of vertical legs and a connecting horizontal leg.

For an eight sided blind, the apparatus further comprises at least one additional pair of hingedly connected frames positioned between the first frame and the third frame and at least one additional pair of hingedly connected frames positioned between the second frame and the fourth frame, each frame for supporting a covering to form a panel and having a pair of vertical legs and a connecting horizontal leg.

The additional frames can be hinged together by a living hinge as described in my issued patent and pending application.

If desired, a latch to position the frames can be positioned on the top plate, or the bottom plate as well as on the horizontal leg.

Figure 2:
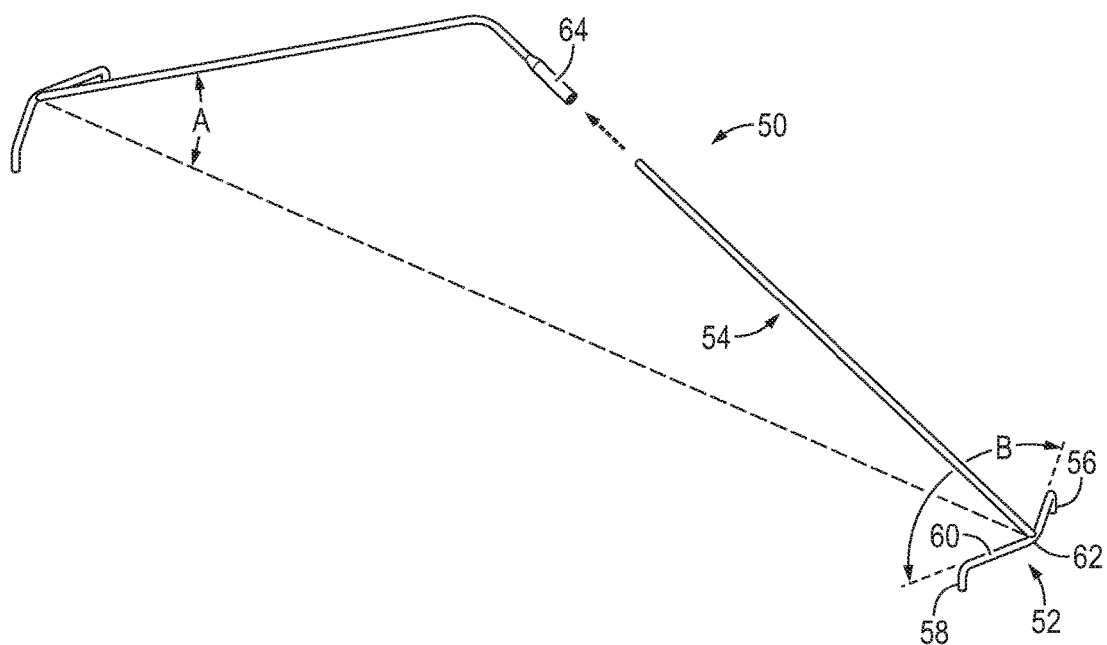
FIG. 2 is a pictorial illustration of a roof frame element.

With reference to FIG. 2, there is shown an element 50 that is useful for a roof brace in a hunting blind. The element comprises a spanner head 52 and an elongated tubular element 54. The spanner head has two short parallel pins 56, 58 extending transversely from a connecting tubing 60 that connects the pins. The elongated tubular element extends transversely from the connecting tubing from a location between the pins. The elongated tubular element has a first end and a second end is attached to the connecting tubing by its first end.

The two pins lie in a first plane and the connecting tubing lies in a second plane (indicated by dashed lines in FIG. 2) that is normal to the first plane. The elongated tubular element has a longitudinal axis intersecting the second plane at an angle A of between about 10 degrees and about 30 degrees. It extends above the second plane whereas the pins extend below. The connecting tubing has a bend 62 located centrally between the pins that measures between about from 90 to about 160 degrees (indicated by Angle B, FIG. 2). The bend divides the connecting tubing into two legs, and the legs extend in the second plane in the general direction of the elongated tubing. For an eight sided blind, the bend measures about 135 degrees.

In a preferred embodiment, a socket 64 is provided that receives the second end of the elongated tubing, and connects the elongated tubular element to the second end of a second elongated tubing having a spanner head on a first end thereof. One elongated tubing can be bent, and the other straight, or the socket can be bent, so that the roof will have a high point for drainage.

In the illustrated embodiment, the second elongated tubing is bent in the general direction of the pins at an angle in the range of 135 to 170 degrees. The bend is located near the socket.

Figure 3:
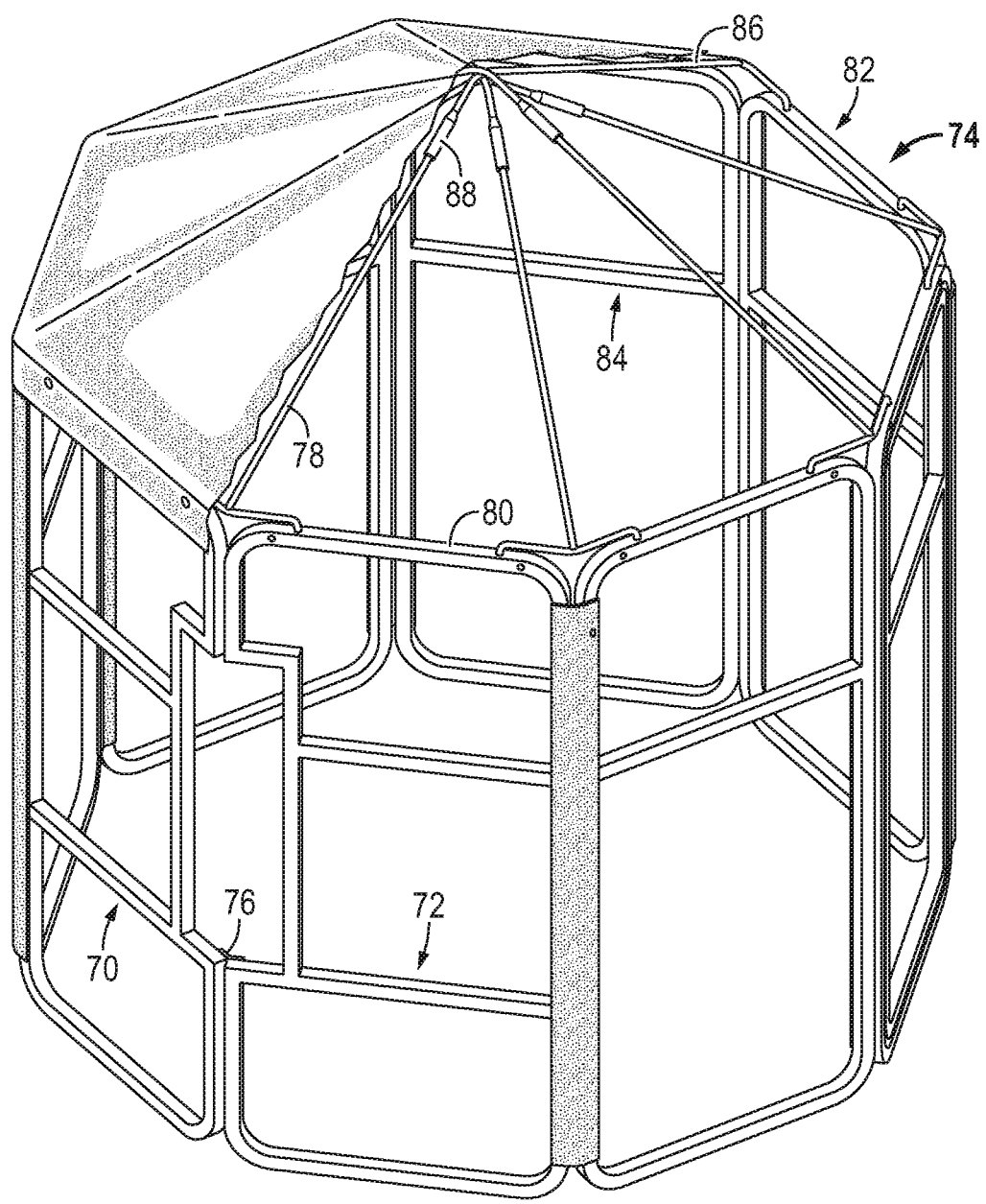
FIG. 3 is a pictorial illustration an eight-panel blind in accordance with another embodiment of the invention with portions of the covering removed to show details of the frame that employs the roof frame element of FIG. 2.

With reference to FIG. 3, there is provided a pair of connected panel frames 70, 72 that are useful in the construction of a hunting blind 74. The apparatus comprises first and second tubular frames, a hinge 76, and a roof frame element 78. The first tubular frame is for supporting a covering to form a panel. The first tubular frame has a pair of vertical legs and a connecting horizontal leg. The frame further has an at least partial top plate 80 extending transversely from an upper end of at least one of the pair of vertical legs. The at least partial top plate defines a borehole parallel to one of the vertical legs. The second tubular frame is supporting a covering to form a panel. The second tubular frame has a pair of vertical legs and a connecting horizontal leg. The second tubular frame is positioned alongside the first tubular frame. The second tubular frame further has at least a partial top plate extending transversely from an upper end of at least one of the pair of vertical legs. The at least partial top plate defines a borehole parallel to one of the vertical legs. The hinge connects a vertical leg of the second frame with a vertical leg of the first frame. The roof frame element has two short parallel pins extending transversely from a connecting tubing that connects the pins and an elongated tubular element extending transversely from the connecting tubing from a location between the pins to partially support a roof cover. The two short parallel pins are positioned one in each of the boreholes to position the plane of the first frame at a predetermined angle with the plane of the second frame and form a first connected pair of frames. Additional frames or pairs of frames and roof frame elements can be used to complete the blind. The frames are covered with a concealing material such as camouflage canvas.

As described with reference to FIG. 2, the two pins lie in a first plane and the connecting tubing lies in a second plane that is normal to the first plane. The elongated tubular element has a longitudinal axis intersecting second plane at an angle of between about 10 degrees and about 30 degrees. The connecting tubing has a bend located centrally between the pins that measures between about from 90 to about 144 degrees. The bend divides the connecting tubing into two legs, and the legs extend in the second plane in the general direction of the elongated tubing. The predetermined angle is selected from about 90 degrees, about 120 degrees, about 135 degrees, and about 144 degrees.

Additional frames can be in the form of a third tubular frame 82 and a fourth tubular frame 84. The frames are for supporting a covering and forming a plane. Each of the frames has a pair of vertical legs and a connecting horizontal leg and further having at least a partial top plate extending transversely from an upper end of at least one of the pair of vertical legs. The at least partial top plate defines a borehole parallel to one of the vertical legs. The frames are connected by a second hinge that connects a vertical leg of the third frame with a vertical leg of the fourth frame. A second roof frame element 86 is provided having two short parallel pins extends transversely from a connecting tubing that connects the pins, and an elongated tubular element extending transversely from the connecting tubing from a location between the pins to partially support a roof covering. The two short parallel pins are positioned one in each of the boreholes in the third frame and the fourth frame to position the plane of the third frame at the predetermined angle with the plane of the fourth frame and form a second connected pair of frames approximately parallel to and spaced apart from the first pair of frames. A socket 88 having a first end and a second end receives an end of the elongated tubular element of the first roof frame element in the first end and an end of the elongated tubular of the second roof frame element in the second end. The socket is positioned above an upper end of the panels so that the roof frame elements define a high point.

For a six sided blind, the apparatus further comprises a fifth frame positioned between the first frame and the third frame and a sixth frame positioned between the second frame and the fourth frame. For an eight sided blind, the apparatus further comprises at least one additional pair of hingedly connected frames positioned between the first frame and the third frame and at least one additional pair of hingedly connected frames positioned between the second frame and the fourth frame. For a four sided blind, either four frames or eight frames will be used. In a preferred embodiment, the frames are provided with full top plates, the frames are constructed of square tubing, and the individual panels have rounded corners.

With reference FIG. 4, another embodiment of the invention provides a covering 100 for a panel frame 102. The covering is generally rectangular and has a front side and a back side, a height, a width, with the height being greater than the width, and an upper portion and a lower portion. A generally rectangular window opening 104 is formed in the upper portion of the panel covering. The window has a length and a width, with the width being greater than the length and being measured parallel to the width of the generally rectangular piece of panel covering. A window cover 106 is provided. The window cover is formed from an opaque, flexible sheet, or alternatively, a translucent veil. In the illustrated embodiment, it is opaque, and the blind is further provided with a translucent veil. The window cover has a front side and a back side and covers the generally rectangular window from the inside. The window cover has a length and a width slightly greater than the window and is attached to the inside of the panel covering by its lower edge along the lower edge of the window. The window cover is held in covering relationship with the window opening by a releasable fastener system 108 connecting the upper edge of the window covering with the back side of the panel covering.

The frame is preferably tubular and has a front side and a back side (shown) with its front side attached to the back side (shown) of the panel covering to form, in combination with the panel covering, a panel. Attachment can be by any suitable means, for example, snaps or Velcro. The tubular frame has a horizontal cross piece 110 extending across the frame near the lower edge of the window opening. The cross piece is draped by the window cover when the releasable fastener system connecting the upper edge of the window cover with the back side of the panel covering has been released. See the central panel. This arrangement provides a cushioned rest when the flap is down.

In a preferred embodiment, the apparatus further comprises a window veil 112, generally a screen. The window veil covers the generally rectangular window opening and has a length and a width slightly larger than the window. The window veil is attached to the inside of the panel covering along the lower edge of the window opening. It is held in covering relationship with the window opening with a releasable fastener system 114 connecting the upper edge of the veil with the back side of the panel covering. In a preferred embodiment, the releasable fastener system 108 comprises elastic loops secured to the upper edge of the window cover and hooks secured to the panel covering, and the releasable fastener system 114 comprises a magnetic strip 1142 secured to the upper edge of the veil and a magnetic strip 1141 secured to the back side of the panel covering.

Additional Description of Preferred Embodiments

FIG. 1 illustrates a hunting blind that is generally lacking in the top plates of my earlier US patent, as well as lacking in window lentil elements. Most of the individual frames are generally H shaped with a pair of upwardly extending arms at the upper ends, but closed at the bottom. The new frames are generally lighter than the frames of U.S. Pat. No. 7,742,781. In a preferred embodiment, each frame is bounded by a pair of uprights of square cross section and adjacent frames are joined together by thermoplastic living hinges alternating between connection to the front sides of adjacent frames and the back sides of adjacent frames, the hinge being placed on the back sides of the frames between the fourth and fifth frames as in my pending application. The blind can be accordion folded.

Each of the panels comprises a pair of parallel king stud elements. At least one of the king stud elements of the pair, preferably only one, is provided with a stubby arm element at its upper end that extends laterally in the plane of the panel for mounting an arcuately shaped roof support element. The stubby arm element defines a borehole parallel to the king stud element for receiving a cylindrical end section of the arcuately shaped roof support element.

Each of the arcuately shaped roof brace elements is long enough to extend across the blind and have a center point that is several inches higher than the upper ends of the panels. The roof brace elements can be formed from rod or tubular stock. Rod or tubular aluminum stock having a diameter in the range of ⅜ to ⅝ inches is suitable. Tubular stock is preferred, and reference to tubular stock herein is not intended to exclude equivalents. The arcuately shaped roof brace elements can be generally arch shaped when viewed from the side with short generally downwardly extending pegs or legs at the ends of the arch for locating in the boreholes of the stubby arm elements. The roof brace elements have high stiffness to resist inward or outward movement of the panels once in place and provide the blind with dimensional stability.

For an eight-panel blind, four roof brace elements are used. Three would be used for a six-panel blind, and two for a four-panel blind. The roof brace elements are separate from each other, because this facilitates placing them in position when the blind is being erected. It also facilitates forming a blind with a single roof brace element to form a half-roof. The half roof configuration can be used if desired with an approximately ⅔ wall height configuration which provides for good visibility and gun clearances.

The roof for the eight panel blind is preferably formed from fabric, more preferably canvas. It has a generally octagonal central part and a peripheral downwardly depending lip. The lip is provided with fastener halves that releaseably attach to complementary fastener halves on the outer surface at the upper end of the panel king stud elements. Snaps are suitable. The octagonal central part has excess material to be loose fitting enough to snugly accommodate the roof brace elements arching underneath. When the roof is snapped onto the king stud elements, the pegs are locked by the fabric and snaps into position in the stubby arm elements and the structure becomes quite rigid.

One embodiment of the invention provides a portable reconfigurable hunting blind assembly comprising an even number of generally rectangular frames, usually 6 or 8, joined together side edge to side edge by n−1 hinges, where n is the number of frames, for accordion folding, and a camouflage covering mounted to each of the frames to define panel-shaped wall units, the camouflage covering defining a window in at least some of the wall units.

A roof frame stabilizes the panel shaped wall units. The roof frame comprises braces having a spanner head and a tail and each spanner head is provided with a pair of protruding face pins for engagement with receiving bores in a pair of adjacent frames for the wall units. The tails of the braces form a frame for the roof and are connected in pairs by bent tubings located near the apex of the roof.

The spanner head generally lies in a plane and the pins generally extend at a right angle from the plane of the spanner head. The tail extends from the plane of the spanner head on the opposite side of the plane from the pins. The tail forms an acute angle with the plane of the spanner head, generally an angle in the range of from about 5 to about 30 degrees with the plane of the spanner head.

The spanner head has arms extending from a connection point with the tail that carry the pins. Preferably, the tail is centrally connected to the spanner head. The arms can be arcuate or straight. Preferably, the tail and the arms extend partly alongside each other. In other words, the arms are doubled back with respect to the tail rather than extending forward.

The arms of the spanner head preferably extend along top edges of a pair of adjacent panels when the brace is in use. The tails connect to the spanner heads at a point roughly in alignment with the hinge lines between the pairs of adjacent panels. The pins are received by boreholes in a top bar of the panel frame. The bar can be truncated, or it can extend all the way across the top of the frame.

Pairs of braces are connected by a tubing which can be bent and located at the apex, or straight and located spaced from the apex, which receives their tails to form trusses for the roof. Typically, the tubing is attached to one of the tails by a pin or the like to prevent its loss and to stabilize the assembly during erection of the trusses and connection to the panels.

Together the trusses form a frame for the roof. For six panels, the frame typically comprises three trusses, for eight panels, the frame typically comprises two or four trusses, depending on the configuration of the blind. A fabric roof extends over the frame and releaseably attaches to the upper ends of the panels to lock the brace elements in position.

In another embodiment of the invention, a window covering for a hunting blind is provided. The covering includes a see-through covering for the window opening in the blind. Typically a screen is used. The screen is releaseably attached along at least a portion of its upper periphery to an inside wall of the blind. Preferably, the attachment means releases silently. For example, magnets or loops or holes positioned along the upper edge of the covering attached to ferrous metal or magnet elements, or hooks or buttons positioned above the window opening on the blind, or vice versa. For a rectangular window opening, the see-through covering will generally also be rectangular, and slightly larger than the window opening in the wall of the blind. The see through covering will typically be attached along its bottom edge to the wall of the blind beneath the opening, for example, by stitching or other fasteners.

In a preferred embodiment, a non-see-through covering is positioned over the see-through covering inside of the blind. The non-see-through covering will typically be fabric, for example, a camouflage covering having a front side surface that matches an outer surface of the blind. The non-see-through covering is releaseably attached along at least a portion of its upper periphery to an inside wall of the blind at a location above the attachment point of the see through covering. Preferably, the attachment releases silently. For example, magnets or loops or holes along the upper edge of the covering attached to ferrous metal or magnet elements, or hooks or buttons positioned above the window on the blind, or vice versa. For a rectangular window, the non-see-through covering will generally also be rectangular, and slightly larger than the see-through covering for the window opening. The non-see-through covering will typically be attached along its bottom edge to the wall of the blind beneath the attachment point for the see-through covering, for example, by stitching or other fasteners.

The blind will typically comprise six or eight panels. The individual panels may have full top plates or partial top plates. Each panel has two boreholes in its upper end to receive the roof braces.

In a preferred embodiment, each frame is bounded by a pair of uprights of square cross section and adjacent frames are joined together by thermoplastic living hinges alternating between connection to the front sides of adjacent frames and the back sides of adjacent frames.

Each of the arcuately shaped roof brace elements is long enough to extend approximately half-way across the blind and when joined to a complementing roof brace element by tubing provides a roof center point that is several inches higher than the upper ends of the panels. The roof brace elements can be formed from rod or tubular stock. Rod or tubular aluminum stock having a diameter in the range of ⅜ to ⅝ inches is suitable.

The roof for the blind is preferably formed from fabric. For an eight-panel blind, it has a generally octagonal central part and a peripheral downwardly depending lip. The lip is provided with fastener halves that releaseably attach to complementary fastener halves on the outer surface at the upper end of the panel king stud elements. Snaps are suitable. The octagonal central part has excess material to be loose fitting enough to snugly accommodate the roof brace elements positioned underneath. When the roof is snapped onto the king stud elements, the pegs are locked by the fabric into the top plates and the structure becomes quite rigid.

While the invention is described with reference to an 8 panel blind arranged in an octagonal foot print, it is within the scope of the invention to use it with other numbers of panels, for example, six panels arranged in a hexagonal footprint.

While certain preferred embodiments of the invention have been described herein, the invention is not to be construed as being so limited, except to the extent that such limitations are found in the claims.

What is claimed is:

1. Apparatus comprising
   a first tubular frame for supporting a covering to form a panel, said first tubular frame having a pair of vertical legs and a connecting horizontal leg, said frame further having at least a partial top plate extending transversely from an upper end of at least one of the pair of vertical legs, wherein the at least partial top plate defines a borehole parallel to one of the vertical legs,
   a second tubular frame for supporting a covering to form a panel, said second tubular frame having a pair of vertical legs and a connecting horizontal leg, said second tubular frame positioned alongside the first tubular frame, said second tubular frame further having at least a partial top plate extending transversely from an upper end of at least one of the pair of vertical legs, wherein the at least partial top plate defines a borehole parallel to one of the vertical legs,
   a hinge connecting a vertical leg of the second frame with a vertical leg of the first frame,
   and
   a roof frame element having two short parallel pins extending transversely from a connecting tubing that connects the pins, and
   an elongated tubular element extending tranversely from the connecting tubing from a location between the pins to partially support a roof cover,
   the two short parallel pins positioned one in each of the boreholes to position the plane of the first frame at a predetermined angle with the plane of the second frame and form a first connected pair of frames.

2. Apparatus as in claim 1 wherein the two pins lie in a first plane and the connecting tubing lies in a second plane that is normal to the first plane.

3. Apparatus as in claim 2 wherein the elongated tubular element has a longitudinal axis intersecting second plane at an angle of between about 10 degrees and about 30 degrees.

4. Apparatus as in claim 3 wherein the connecting tubing has a bend located centrally between the pins that measures between about from 90 to about 144 degrees.

5. Apparatus as in claim 1 further comprising
   a third tubular frame for supporting a covering and forming a panel, said third tubular frame having a pair of vertical legs and a connecting horizontal leg and further having at least a partial top plate extending transversely from an upper end of at least one of the pair of vertical legs, wherein the at least partial top plate defines a borehole parallel to one of the vertical legs,
   a fourth tubular frame for supporting a covering and forming a panel, said fourth tubular frame having a pair of vertical legs and a connecting horizontal leg, said fourth tubular frame positioned alongside the first tubular frame, said fourth tubular frame further having at least a partial top plate extending transversely from an upper end of at least one of the pair of vertical legs, wherein the at least partial top plate defines a borehole parallel to one of the vertical legs,
   a second hinge connecting a vertical leg of the third frame with a vertical leg of the fourth frame,
   and
   a second roof frame element having two short parallel pins extending transversely from a connecting tubing that connects the pins, and an elongated tubular element extending tranversely from the connecting tubing from a location between the pins to partially support a roof covering, the two short parallel pins positioned one in each of the boreholes in the third frame and the fourth frame to position the plane of the third frame at the predetermined angle with the plane of the fourth frame and form a second connected pair of frames approximately parallel to and spaced apart from the first pair of frames, and a socket having a first end and a second end receiving an end of the elongated tubular element of the first roof frame element in the first end and an end of the elongated tubular of the second roof frame element in the second end, the socket being positioned above an upper end of the panels so that the roof frame elements form a peak.

6. Apparatus as in claim 5 further comprising a fifth frame positioned between the first frame and the third frame and a sixth frame positioned between the second frame and the fourth frame.

7. Apparatus as in claim 5 further comprising at least one additional pair of hingedly connected frames positioned between the first frame and the third frame and at least one additional pair of hingedly connected frames positioned between the second frame and the fourth frame.

\* \* \* \* \*